12) United States Patent
Chow et al.

(10) Patent No.: US 8,557,206 B2
(45) Date of Patent: Oct. 15, 2013

(54) CONFIGURATIONS AND METHODS FOR EFFLUENT GAS TREATMENT

(75) Inventors: Thomas King Chow, Irvine, CA (US); Vincent Wai Wong, Hacienda Heights, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 947 days.

(21) Appl. No.: 11/568,010

(22) PCT Filed: Apr. 22, 2004

(86) PCT No.: PCT/US2004/012599
§ 371 (c)(1), (2), (4) Date: Sep. 9, 2008

(87) PCT Pub. No.: WO2005/113429
PCT Pub. Date: Dec. 1, 2005

(65) Prior Publication Data
US 2009/0004070 A1 Jan. 1, 2009

(51) Int. Cl.
*B01D 53/50* (2006.01)
*C01B 17/16* (2006.01)

(52) U.S. Cl.
USPC ...... 423/224; 422/170; 422/171; 423/244.09; 423/564

(58) Field of Classification Search
USPC .......... 422/168, 169, 170, 171; 423/219, 220, 423/224, 228, 230, 244.01, 244.09, 564, 423/574.1, 576.8
See application file for complete search history.

(56) References Cited

U.S. PATENT DOCUMENTS

| 3,719,742 | A | | 3/1973 | Terrana et al. |
| 3,752,877 | A | * | 8/1973 | Beavon ............... 423/244.1 |
| 3,790,660 | A | | 2/1974 | Earl et al. |
| 3,904,735 | A | | 9/1975 | Atwood et al. |
| 4,080,428 | A | | 3/1978 | Holter et al. |
| 4,085,199 | A | | 4/1978 | Singleton et al. |
| 4,634,582 | A | | 1/1987 | Sliger et al. |
| 4,892,717 | A | | 1/1990 | Hass |
| 4,908,201 | A | | 3/1990 | Cabanaw |
| 4,919,912 | A | | 4/1990 | Taggart et al. |
| 5,352,433 | A | | 10/1994 | Watson |
| 5,514,351 | A | | 5/1996 | Buchanan et al. |
| 7,384,611 | B2 | * | 6/2008 | Chen ........................ 422/170 |

FOREIGN PATENT DOCUMENTS

| EP | 0140191 A2 | 8/1985 |
| EP | 0140191 A3 | 8/1985 |
| WO | 03/045544 A1 | 6/2003 |

* cited by examiner

*Primary Examiner* — Jill Warden
*Assistant Examiner* — Joye L Woodard
(74) *Attorney, Agent, or Firm* — Fish & Associates, PC

(57) ABSTRACT

Methods and configurations are drawn to a plant in which an effluent gas (102) comprising oxygen and sulfur dioxide is catalytically reacted with hydrogen sulfiden (148) and hydrogen and/or carbon monoxide (114) to form a treated gas that is substantially oxygen free and in which sulfur dioxide is converted to hydrogen sulfide. In most preferred aspects, the hydrogen sulfide is provided to the process via a recycle loop (134B).

14 Claims, 1 Drawing Sheet

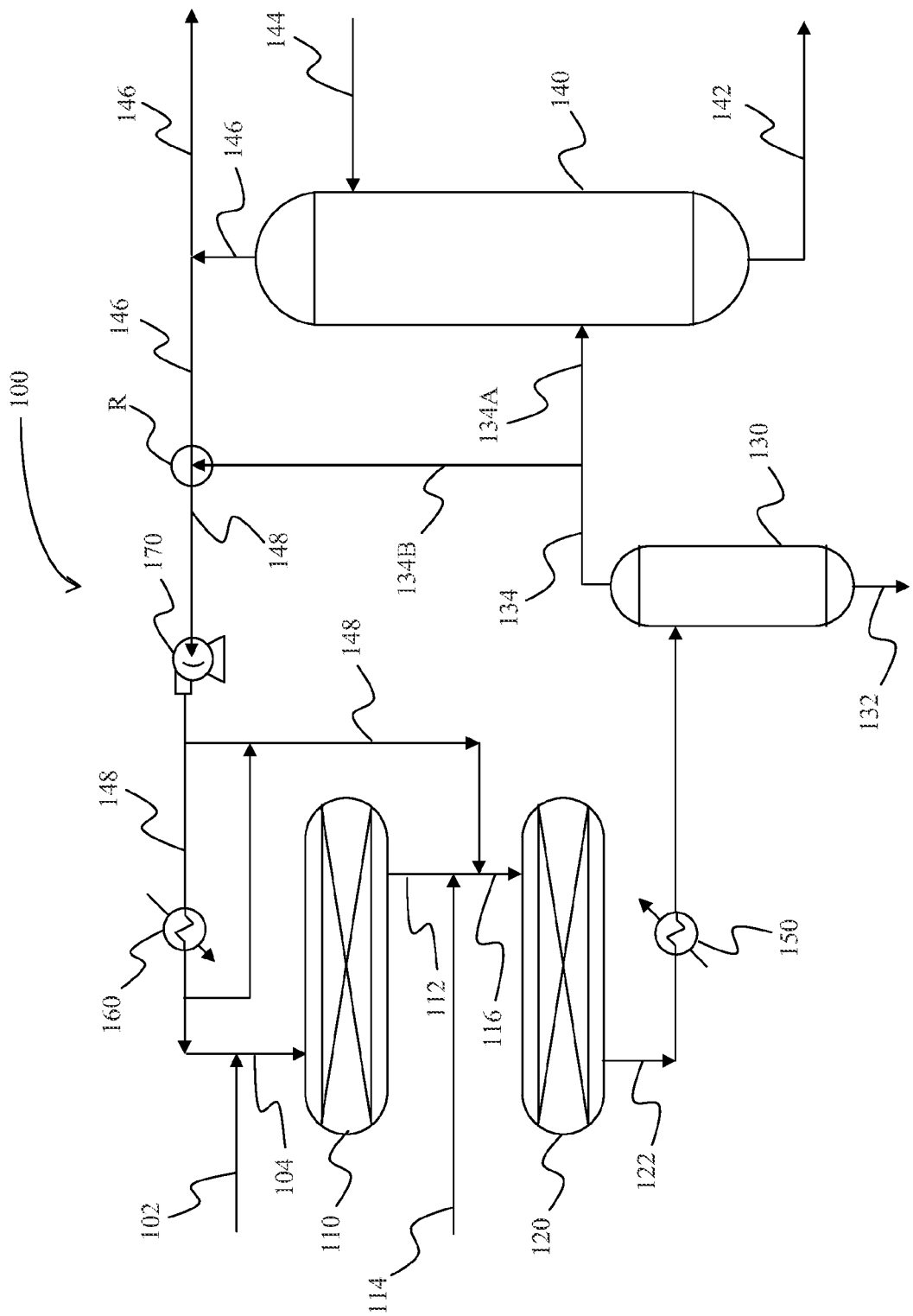

CONFIGURATIONS AND METHODS FOR EFFLUENT GAS TREATMENT

FIELD OF THE INVENTION

The field of the invention is treatment of effluent gases, and especially removal of sulfur dioxide from oxygen-containing gases.

BACKGROUND OF THE INVENTION

Sulfur removal from waste gases has become increasingly important as regulations require refineries and other petrochemical facilities to reduce their output of sulfurous compounds below previously tolerated concentrations. Depending on the type of waste gas (e.g., effluent gas from a Claus plant, fluid catalytic cracking (FCC) unit, or coking unit), various processes are known in the art to recover sulfur from waste gases.

For example, sulfur dioxide is removed in some of the known configurations using a caustic process in which gaseous sulfur compounds are converted into soluble sulfite/sulfate compounds, and typical examples of such configurations are described in U.S. Pat. Nos. 3,719,742 to Terrana et al. and 3,790,660 to Earl et al. However, most of such configurations have a relatively high stripping steam requirement and are therefore economically less attractive. Other known caustic processes are described, for example, in U.S. Pat. No. 3,920,794 to La Mantia et al. Here, NaOH and $Na_2CO_3$ scrubbing solutions remove $SO_2$ from gas streams. After the adsorption or scrubbing step, an oxidation step is performed to convert sulfites to sulfates by addition of catalytically effective metals (e.g., Fe, Cu, Co, Mn, and/or Ni). While such oxidation is relatively simple and effective, salts need to be added, and a secondary oxidation step may be required if the level of sulfites in the scrubbing solution after adsorption of $SO_2$ is relatively high.

To overcome at least some of the problems associated with caustic solutions, alkanolamines (e.g., aqueous solutions of triethanolamine) can be used to absorb $SO_2$ from a waste gas as described for example, in U.S. Pat. No. 3,904,735 to Atwood et al. However, several difficulties nevertheless remain. Among other things, many alkanolamines have a relatively low selectivity towards $SO_2$, and tend to absorb significant quantities of $CO_2$. Still further, at least some of the alkanolamines exhibit relatively high evaporative losses, and often promote oxidation of $SO_2$ to $SO_3$ where oxygen is present.

In still further known non-caustic processes, as described in U.S. Pat. No. 4,634,582 to Sliger et al., $SO_2$ is removed from a waste gas stream by absorption in a buffered aqueous thiosulfate and polythionate solution, followed by regeneration of the enriched solution with hydrogen sulfide to form sulfur. Hydrogen sulfide recovered from the regeneration step is then introduced to the absorption step to reduce bisulfite concentration in the enriched solution. While such desulfurization is conceptually relatively simple, maintenance of the buffered solution often limits the capacity of such systems in at least some instances.

Alternatively, as described in our co-pending International patent application (published as WO 03/045544), sulfur dioxide-containing waste gas is introduced into a reducing gas generator that is operated using natural gas, air, and hydrogen to supply sufficient reducing gas to the effluent gas. Typical operation conditions are selected such that the oxygen is substantially completely removed from the waste gas, operation temperatures will generally be between about 1000° and 1500° F. The so formed hydrotreated feed gas comprises hydrogen sulfide, which is removed using a contactor. Such configurations advantageously improve desulfurization under most conditions. However, high temperature operation and supplemental fuel gas are generally needed, which typically increases cost and complexity of the operation.

Although various configurations and methods are known to reduce sulfur concentrations in oxygen-containing effluent streams, all or almost all of them suffer from one or more disadvantages. Therefore, there is still a need to provide improved methods and configuration to reduce the sulfur content in such streams.

SUMMARY OF THE INVENTION

The present invention is directed to configurations and methods for sulfur dioxide removal from oxygen-containing waste gases in which oxygen is catalytically removed using hydrogen sulfide to form sulfur dioxide, and in which the sulfur dioxide is catalytically converted to hydrogen sulfide (e.g., using hydrogen or carbon monoxide), which is then removed from the gas stream using solvent absorption.

In one aspect of the inventive subject matter, a plant includes a first catalytic reactor that receives an effluent gas comprising oxygen and sulfur dioxide, and a second gas comprising $H_2S$. The first reactor further comprises a catalyst that catalyzes a reaction in which the oxygen reacts with the hydrogen sulfide to form an oxygen-free gas comprising water and sulfur dioxide. A second catalytic reactor is fluidly coupled to the first reactor and receives the oxygen-free gas, wherein the second catalytic reactor further includes a hydrogenation catalyst that catalyzes a reaction in which the sulfur dioxide from the oxygen-free gas and hydrogen and/or carbon monoxide react to form a reduced oxygen-free gas comprising hydrogen sulfide.

In particularly contemplated plants, a separator receives the reduced oxygen-free gas to form a condensate and a hydrogen sulfide containing gas, and may further include an absorber that receives the hydrogen sulfide containing gas, wherein a lean solvent absorbs at least part of the hydrogen sulfide to form a treated gas. While not limiting to the inventive subject matter, it is generally preferred that the second gas comprises the hydrogen sulfide containing gas from the separator and/or the treated gas from the absorber.

In another aspect of the inventive subject matter, a plant for desulfurization of a waste gas that includes oxygen and sulfur dioxide includes a first reactor that receives the waste gas and in which hydrogen sulfide is recycled from either upstream or downstream of the absorber and added to the waste gas in an amount effective to catalytically deplete the waste gas from oxygen. A second reactor receives the oxygen-depleted waste gas and hydrogen is added to the oxygen-depleted waste gas to catalytically reduce the sulfur dioxide to hydrogen sulfide.

In preferred aspects of contemplated plants, a separator receives the reduced and oxygen-depleted waste gas from the second reactor to form a condensate and a hydrogen sulfide containing gas, and an absorber receives the hydrogen sulfide containing gas from the separator, wherein a lean solvent absorbs at least part of the hydrogen sulfide to form a treated gas. It is still further preferred that the hydrogen sulfide that is added to the waste gas is derived from at least one of the hydrogen sulfide containing gas from the separator and the treated gas from the absorber.

In a further aspect of the inventive subject matter, a method of desulfurizing an oxygen-containing waste gas includes a step in which a waste gas is provided that includes sulfur dioxide and oxygen. In another step, the waste gas is combined with hydrogen sulfide in an amount sufficient to deplete the waste gas from oxygen in a catalytic reaction in which the hydrogen sulfide is oxidized to sulfur dioxide to thereby form an oxygen-depleted gas, and in yet another step, the oxygen-depleted gas is reacted with hydrogen to reduce the sulfur dioxide to hydrogen sulfide to thereby form a reduced oxygen-depleted gas. With respect to a separator and an absorber, the same considerations as provided above apply.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWINGS

FIG. 1 is an exemplary schematic configuration for removal of sulfur dioxide from oxygen-containing gases according to the inventive subject matter.

DETAILED DESCRIPTION

The inventors have discovered that sulfur dioxide can be removed from oxygen-containing effluent gases in a highly efficient manner without the need of a high-temperature operation (e.g., as used in direct firing). In especially preferred aspects, the temperatures for oxygen and sulfur removal are typically below 600° F.-900° F., and both oxygen and sulfur dioxide are removed in separate catalytic reactions using hydrogen sulfide and hydrogen, respectively.

In one particularly preferred aspect, as depicted in FIG. 1, a plant includes a desulfuration unit 100 having a first catalytic reactor 110 that is fluidly coupled to a second catalytic reactor 120. The effluent of the second catalytic reactor 120 is separated in separator 130, which provides a gas stream to absorber 140.

Most typically, a waste gas 102 containing oxygen and sulfur dioxide at a temperature of, or preheated to a temperature of about 400° F.-600° F. is mixed with the hydrogen sulfide-containing recycle stream 148 (which is heated by heater 160 to a temperature of about 400° F.-600° F.) to form mixed stream 104 that is introduced into the first catalytic reactor 110. The first catalytic reactor 110 typically includes a catalyst that catalyzes a reaction in which the oxygen from the waste gas 102 is substantially completely (i.e., at least 95%, more typically at least 98%) consumed to form sulfur dioxide and water, which leaves the first catalytic reactor 110 in oxygen-free product stream 112. It should be noted that some of the sulfur dioxide in the first catalytic reactor will react with hydrogen sulfide in a Claus-type reaction to form elemental sulfur as the typical operating temperature in the first catalytic reactor is between about 400° F.-800° F.

The so formed oxygen-free product stream 112 is then cooled via mixing with the recycle stream 148 and hydrogen, and/or carbon monoxide stream 114 such that the temperature of the combined stream 116 is in the range of about 400° F.-600° F. Consequently, as the second catalytic reactor 120 includes a catalyst that catalyzes reduction of sulfur dioxide to hydrogen sulfide, the sulfur dioxide (and at least part of the elemental sulfur) of the oxygen-free product stream 112 is converted to hydrogen sulfide in the second catalytic reactor 120. Typical effluent temperature of the second catalytic reactor is generally between 600° F.-850° F., which is preferably controlled by adjusting the amount of recycle stream 148 to the second catalytic reactor 120. Second product stream 122 leaves the second catalytic reactor 120, and heat is extracted from stream 122 in exchanger 150 (e.g., by converting boiler feed water into steam) before entering separator 130. Water condensate is removed from second catalytic reactor effluent 122 (which includes reduced oxygen-free gas comprising hydrogen sulfide) in the separator 130 as stream 132, and one portion of the so processed vapor stream 134 enters the absorber 140 as stream 134A, while another portion 134B is recycled to the first catalytic converter 110 as stream 148. Depending on the actual characteristics of the stream 102 and the specific sulfur removal requirement, stream 134B can be eliminated and replaced by stream 146 as the recycle stream to the first catalytic converter 110. In such cases, the entire stream 134 enters the absorber 140 without splitting. Recycle stream 148 is boosted by booster 170, and at least a portion of the recycle stream 148 is heated by exchanger 160 before mixing the (heated) recycle stream with the waste gas 102 and/or oxygen-free product stream 112.

The regenerator 140 is preferably a conventional absorber tower in which an amine solution absorbs the hydrogen sulfide from stream 134 or stream 134A to thereby generate a desulfurized stream 146, which is either vented into the atmosphere or recycled to the first catalytic converter 110 as stream 148. Under most operating conditions, the desulfurized stream 146 comprises less than 10-150 ppmv of hydrogen sulfide. Lean amine enters the absorber as stream 144 and rich amine solution exits the absorber as stream 142, which is regenerated using known processes.

With respect to the waste gas, it should be recognized that while regenerator gases from an S Zorb process (Sulfur removal process using a sulfur-containing sorbent that removes sulfur from a sulfur-containing molecule in a feed contacting the catalyst (see e.g., Conoco Phillips' S Zorb process)) are typically preferred, numerous alternative gases are also deemed suitable for use herein and generally include all gases that comprise oxygen (preferably less than 10%) and sulfur dioxide (preferably less than 5%). Therefore, contemplated waste gases include FCC flue gases, or coker flue gases. In some of the preferred aspects, the waste gas may have a sulfur dioxide concentration of less than 2.0%. For example, the sulfur dioxide concentration in suitable gas streams may be between 1.2% and 2.0%, and even lower. Where the sulfur dioxide concentration of a feed gas is higher, it is generally preferred that the ratio of recycle gas to waste gas is adjusted such that the maximum sulfur dioxide concentration in the mixed stream 104 is less than 2%, and more typically less than 1.5%.

It should be particularly recognized, however, that the amount of recycle gas that is admixed to the waste gas is chosen such that the recycle gas will provide hydrogen sulfide in a quantity sufficient for the oxygen contained in the waste gas to be consumed by a reaction in the first reactor that produces (among other things) sulfur dioxide from oxygen and hydrogen sulfide. Therefore, the composition of the recycle gas may vary, and it should be appreciated that the hydrogen sulfide content of the recycle gas may be regulated via regulator R by adjusting the ratio of stream 134B (rich in hydrogen sulfide) or stream 146 (lean in hydrogen sulfide). However, in alternative aspects, reducing agents (e.g., hydrogen sulfide, hydrogen, etc.) may be provided by sources other than streams 134B and 146, and suitable hydrogen sulfide sources include Claus plant feed streams, or sour gas streams from amine regeneration.

Preferred first catalytic reactors include a catalyst that catalyzes a reaction in which oxygen from an oxygen-containing gas reacts with hydrogen sulfide (contained in that gas or added to that gas) to form an oxygen-free gas (i.e., less than 1%, more typically less than 0.5%, and most typically less than 0.1%) comprising sulfur dioxide. Therefore, contemplated catalysts include all catalysts that promote oxidation of hydrogen sulfide, and especially include various alumina catalysts, titanium oxide catalysts and vanadium-antimony catalysts. It should further be appreciated that depending on the type of catalyst and oxygen content, the reaction temperature in the first catalytic reactor will generally be in the range of between about 400° F. to 800° F. However, lower temperatures (e.g., between 300° F. to 400° F.) or higher temperatures (e.g., between 800° F. to 950° F.) are also deemed suitable. Appropriate operating temperatures can be maintained by preheating the recycle gas and/or the waste gas (e.g., to a temperature of between about 400° F. to 600° F.). Typically, some of the hydrogen sulfide in the first catalytic reactor will react with some of the sulfur dioxide in a Claus-type reaction to form water and elemental sulfur.

With respect to the second catalytic reactor, it is contemplated that all known hydrogenation reactors may be employed for use in conjunction with the teachings presented herein. Furthermore, it is generally preferred that contemplated second catalytic reactors will include a hydrogenation catalyst that catalyzes a reaction in which sulfur dioxide and hydrogen, and/or carbon monoxide, react to form hydrogen sulfide and water. There are numerous hydrogenation catalysts known in the art and all of the known catalysts are considered suitable for use herein. However, especially preferred catalysts include cobalt molybdenum catalysts, ceria catalysts, or zirconia catalysts. Consequently, the sulfur dioxide from the oxygen-free gas provided by the first reactor will react in the second reactor with added hydrogen to form a reduced oxygen-free gas comprising $H_2S$.

Hydrogen is generally added to the effluent from the first catalytic reactor or directly to the second catalytic reactor in an amount sufficient to convert substantially all (i.e., at least 95%, more typically at least 99%) of the sulfur dioxide into hydrogen sulfide. Therefore, the exact amount of hydrogen, and/or carbon monoxide, will vary, however, it should be recognized that a person of ordinary skill in the art will readily be able to determine the appropriate quantity. Hydrogen and/or carbon monoxide may be added in numerous manners and from various sources, and contemplated hydrogen streams may include purified hydrogen (e.g., from a PSA), or streams enriched in hydrogen and/or carbon monoxide (e.g., hydrogen-containing recycle streams).

With respect to the temperature of the oxygen-depleted gas that enters the second catalytic reactor, it is generally preferred that the oxygen-depleted gas is cooled to a temperature range of between about 400° F. to 600° F. and the $SO_2$ concentration of less than 2%. Preferably, such cooling and/or dilution are accomplished via mixing the oxygen-depleted gas 112 from the first catalytic reactor with recycle gas 148 (which may or may not be preheated). In such configurations, it should be especially recognized that the cooling/diluting agent (i.e., the recycle gas) is free from oxygen and may comprise hydrogen sulfide. However, cooling may also be done via heat sinks (e.g., heat exchanger), and it should be recognized that lower temperatures (e.g., between 300° F. to 400° F.) or even higher temperatures (e.g., between 600° F. to 750° F.) are also contemplated.

The so produced effluent from the second catalytic reactor (the hydrogen sulfide-containing oxygen-free gas) is then cooled, preferably in a heat exchanger and condensate is removed after cooling in a separator before the cooled gas is desulfurized in an absorber using methods well known in the art. Typically, the absorber is an amine absorber that uses an amine-based solvent to extract the hydrogen sulfide from the effluent of the second catalytic reactor. The so produced rich solvent is then processed using solvent regeneration processes well known in the art. Alternatively, a direct contact condenser could be used for cooling and condensate removal.

Therefore, the inventors generally contemplate a plant comprising a first catalytic reactor that receives an effluent gas comprising oxygen and sulfur dioxide, and that further receives a second gas comprising hydrogen sulfide, wherein the first reactor further includes a catalyst that catalyzes a reaction in which the oxygen reacts with the hydrogen sulfide to form an oxygen-free gas comprising water and sulfur dioxide. Such plants also include a second catalytic reactor that is fluidly coupled to the first reactor and receives the oxygen-free gas. Suitable second catalytic reactors comprise a hydrogenation catalyst that catalyzes a reaction in which the sulfur dioxide from the oxygen-free gas and hydrogen, and/or carbon monoxide react to form a reduced oxygen-free gas comprising hydrogen sulfide. It should further be appreciated that the first and second reactors could be disposed in a single vessel comprising of two separate catalyst beds with sufficient space for gas mixing in between the two separate catalytic beds.

Viewed from another perspective, it is therefore contemplated that a plant for desulfuration of a waste gas that includes oxygen and sulfur dioxide will include a first reactor that receives the waste gas and in which hydrogen sulfide is added to the waste gas in an amount effective to catalytically deplete the waste gas from oxygen, and a second reactor that receives the oxygen-depleted waste gas and in which hydrogen and/or carbon monoxide is added to the oxygen-depleted waste gas to catalytically reduce the sulfur dioxide to hydrogen sulfide.

Consequently, a method of desulfurizing an oxygen-containing waste gas has one step in which a waste gas is provided that includes sulfur dioxide and oxygen. In another step, the waste gas is combined with hydrogen sulfide in an amount sufficient to deplete the waste gas from oxygen in a catalytic reaction in which the hydrogen sulfide is oxidized to sulfur dioxide to thereby form an oxygen-depleted gas. In yet another step, the oxygen-depleted gas is catalytically reacted with hydrogen to reduce the sulfur dioxide to hydrogen sulfide, to thereby form a reduced oxygen-depleted gas.

Thus, specific embodiments and applications for configurations and methods for improved effluent gas treatment have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of desulfurizing an oxygen-containing waste gas, comprising:
   providing from a waste gas source a waste gas that includes sulfur dioxide and oxygen;
   combining the waste gas with a first portion of a recycled stream of hydrogen sulfide in an amount sufficient to deplete the waste gas from oxygen in a catalytic reaction in which the hydrogen sulfide is oxidized to sulfur dioxide to thereby form an oxygen-depleted gas; and reacting the oxygen-depleted gas with at least one of externally added hydrogen and externally added carbon monoxide to reduce the sulfur dioxide to hydrogen sulfide to thereby form a reduced oxygen-depleted gas comprising hydrogen sulfide;

using a second portion of the recycled stream to control effluent temperature of the second reactor;

using at least a portion of the hydrogen sulfide from the reduced oxygen-depleted gas as the recycled stream;

wherein the recycled stream is formed from the reduced oxygen-depleted gas comprising hydrogen sulfide and an absorber overhead product; and adjusting a ratio of the reduced oxygen-depleted gas comprising hydrogen sulfide and the absorber overhead product to thereby provide hydrogen sulfide to the catalytic reaction in a quantity sufficient for the oxygen contained in the waste gas to be consumed by the catalytic reaction.

2. The method of claim 1 wherein the reduced oxygen-depleted gas is separated in a separator to form a condensate and a portion of the recycled stream of hydrogen sulfide.

3. A plant for catalytic reduction of sulfur dioxide in an oxygen-containing effluent gas, comprising:

an effluent gas source that is configured to provide an effluent gas comprising oxygen and sulfur dioxide, wherein the effluent gas source is coupled to a first catalytic reactor to thereby feed the effluent gas into the first catalytic reactor;

wherein the first catalytic reactor is further configured to receive a first portion of a recycle gas comprising hydrogen sulfide, the first reactor further comprising a catalyst that catalyzes a reaction in which the oxygen reacts with the hydrogen sulfide to form a sulfur dioxide-containing oxygen-free gas comprising water and sulfur dioxide; and a second catalytic reactor fluidly coupled to the first reactor and receiving the sulfur dioxide-containing oxygen-free gas, the second catalytic reactor further comprising a hydrogenation catalyst that catalyzes a reaction in which the sulfur dioxide from the oxygen-free gas and at least one of hydrogen and carbon monoxide react to form a reduced oxygen-free gas comprising hydrogen sulfide;

wherein the second catalytic reactor is further configured to receive a second portion of the recycle gas in an amount effective to control effluent temperature of the second reactor; and wherein the recycle gas is a mixture of the reduced oxygen-free gas comprising hydrogen sulfide and a hydrogen sulfide-depleted absorber overhead product, and wherein a regulator is configured to adjust a ratio of the reduced oxygen-free gas comprising hydrogen sulfide and the hydrogen sulfide-depleted absorber overhead product.

4. The plant of claim 3 further comprising a separator that receives the reduced oxygen-free gas to form a condensate and a hydrogen sulfide containing gas.

5. The plant of claim 4 further comprising an absorber that receives the hydrogen sulfide containing gas, and in which a lean solvent absorbs at least part of the hydrogen sulfide to form the hydrogen sulfide-depleted absorber overhead product.

6. The plant of claim 5 wherein the ratio of the reduced oxygen-free gas comprising hydrogen sulfide and the hydrogen sulfide-depleted absorber overhead product is a function of a chemical composition of the effluent gas.

7. The plant of claim 3 wherein heat is extracted from the reduced oxygen-free gas before entering a separator or absorber.

8. The plant of claim 3 further comprising a heat exchanger that is configured to heat at least one of the effluent gas and the first portion of the recycle gas to a temperature of between 400° F. to 600° F. before entering the first catalytic reactor.

9. The plant of claim 3 wherein the catalyst in the first catalytic reactor comprises alumina, titanium oxide, or a vanadium-antimony catalyst.

10. The plant of claim 3 wherein the catalyst in the second catalytic reactor comprises a cobalt molybdenum catalyst, a ceria catalyst, or a zirconia catalyst.

11. A plant for desulfurization of a waste gas that dudes oxygen and sulfur dioxide, comprising:

a first reactor that is configured to receive the waste gas from a waste gas source and further configured to receive hydrogen sulfide from a first portion of a recycle stream in an amount effective to catalytically deplete the waste gas from oxygen and to produce a sulfur dioxide-containing oxygen-depleted waste gas; and a second reactor that receives the sulfur dioxide-containing oxygen-depleted waste gas, wherein the second reactor is configured to allow addition of at least one of hydrogen and carbon monoxide from an external source to the oxygen-depleted waste gas in an amount sufficient to catalytically reduce the sulfur dioxide to hydrogen sulfide;

wherein the second reactor is further configured to receive a second portion of the recycle stream in an amount effective to control effluent temperature of the second reactor;

a recycling circuit that is configured to allow use of at least a portion of the hydrogen sulfide from the second reactor as the recycle stream;

wherein the recycle stream is a mixture of the sulfur dioxide-containing oxygen-depleted waste gas and a hydrogen sulfide-depleted absorber overhead product; and wherein a regulator is coupled to the recycling circuit and configured to adjust a ratio of the sulfur dioxide-containing oxygen-depleted waste gas and the hydrogen sulfide-depleted absorber overhead product.

12. The plant of claim 11 further comprising a separator that receives the reduced and oxygen-depleted waste gas from the second reactor to form a condensate and a hydrogen sulfide containing gas.

13. The plant of claim 12 further comprising an absorber that receives the hydrogen sulfide containing gas from the separator, and in which a lean solvent absorbs at least part of the hydrogen sulfide to form the hydrogen sulfide-depleted absorber overhead product.

14. The plant of claim 13 wherein the hydrogen sulfide is added to the waste gas is derived from at least one of the hydrogen sulfide containing gas from the separator and the hydrogen sulfide-depleted absorber overhead product from the absorber.

* * * * *